United States Patent [19]

Karl

[11] Patent Number: 4,643,656

[45] Date of Patent: Feb. 17, 1987

[54] TAKE-AWAY DEVICE FOR PLASTIC TUBING

[75] Inventor: Veit-Holger Karl, Bobingen, Fed. Rep. of Germany

[73] Assignee: Alpine Aktiengesellschaft, Augsburg, Fed. Rep. of Germany

[21] Appl. No.: 817,508

[22] Filed: Jan. 9, 1986

[30] Foreign Application Priority Data

Jan. 18, 1985 [DE] Fed. Rep. of Germany ... 8501177[U]

[51] Int. Cl.⁴ .................................................. B29C 53/20
[52] U.S. Cl. ................... 425/72 R; 264/566; 425/327; 425/387.1
[58] Field of Search ............... 425/72 R, 326.1, 387.1, 425/366, 140, 150, 163, 325, 327, 394; 264/562–569, 310

[56] References Cited

U.S. PATENT DOCUMENTS

| | | | |
|---|---|---|---|
| 2,844,846 | 7/1958 | Kronholm | 425/326.1 X |
| 3,161,942 | 12/1964 | Cheney | 425/325 X |
| 3,576,935 | 4/1971 | Dyer et al. | 425/327 X |
| 3,632,265 | 1/1972 | Upmeier | 425/326.1 |
| 3,657,974 | 4/1972 | Hedrich et al. | 425/327 X |
| 3,716,322 | 2/1973 | Kratzert | 425/327 X |
| 3,768,949 | 10/1973 | Upmeier | 264/566 X |
| 3,804,571 | 4/1974 | Upmeier | 425/327 X |
| 3,804,572 | 4/1974 | Upmeier | 425/72 R X |
| 3,860,380 | 1/1975 | Upmeier | 425/326.1 |
| 4,061,707 | 12/1977 | Nohtomi et al. | 264/569 X |
| 4,201,741 | 5/1980 | Pannenbecker | 264/40.2 X |
| 4,246,212 | 1/1981 | Upmeier et al. | 264/564 X |
| 4,351,785 | 9/1982 | Upmeier et al. | 264/566 X |

FOREIGN PATENT DOCUMENTS

| | | |
|---|---|---|
| 1948935 | 4/1971 | Fed. Rep. of Germany . |
| 2035584 | 3/1972 | Fed. Rep. of Germany . |
| 2156079 | 8/1972 | Fed. Rep. of Germany . |

*Primary Examiner*—Richard L. Chiesa
*Attorney, Agent, or Firm*—Edward E. Pascal

[57] ABSTRACT

A take-away device for a plastic tubing produced in a blowing process in which the tubing is flattened by squeeze rollers followed by a pair of take-away rollers. The pair of take-away rollers which have horizontal axes of rotation swivel reversingly about a vertical axis of rotation. The flattened tubing is fed to a stationary wind-up device, whereby two turning rods over which the flattened tubing is guided, are arranged between the take-away rollers and the stationary wind-up device, and swivel reversingly about the vertical axis of rotation of the pair of squeeze rollers. The first turning rod can thereby be swivelled about a first vertical axis which, together with the take-away rollers, swivels about the vertical axis of rotation of the pair of take-away rollers. The second turning rod can be turned about a second vertical axis which forms a plane with the vertical axis of rotation of the pair of take-away rollers, which extends parallel to the direction of travel of the tubing from the second turning rod to the wind-up device.

11 Claims, 11 Drawing Figures

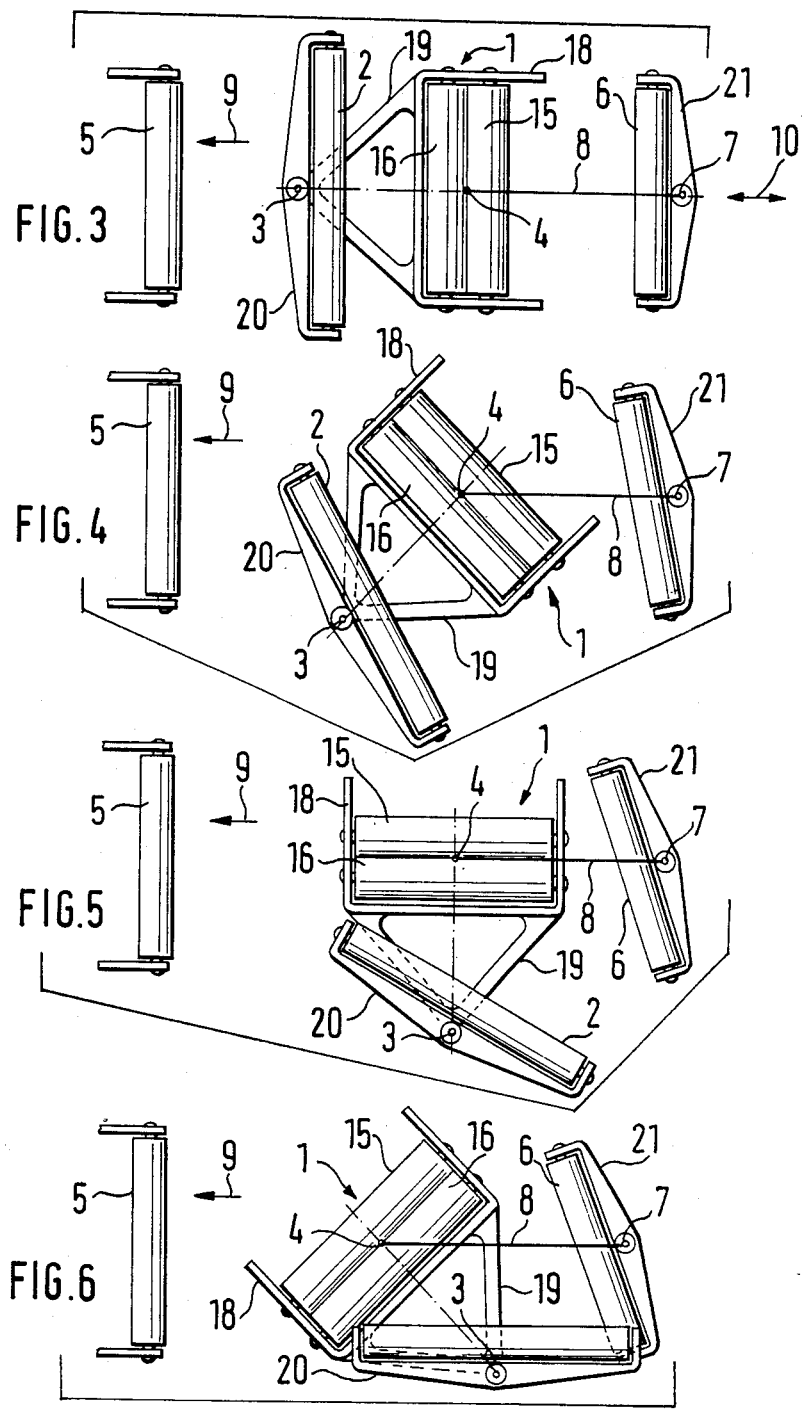

TAKE-AWAY DEVICE FOR PLASTIC TUBING

This invention relates to a take-away device used in the manufacture of plastic tubing.

In a prior art device, such as described in German Pat. No. 19 48 935, the direction of travel of the tubing proceeds between two take-away or squeeze rollers to a first deflecting rod, from there to a first turning rod, from said turning rod to a second deflecting rod and from there to a winding-up device via a second turning rod. The longitudinal axes of the take-away rollers, of the deflecting and turning rods extend horizontally in each case. The two take-away rollers rotate about a vertical axis of rotation by ±180°. The first deflecting rod extends parallel to the two take-away rollers and rotates with these about the horizontal axis of rotation. With their longitudinal axes, each of the two deflecting rods form chords of circles, whose center coincides with the vertical axis of rotation. The swivel axis of both turning rods coincides with the vertical axis of rotation. The first turning rod is turned by an angle of ±45° relative to its parallel position to the first deflecting rod. This is also true for the angular movement of the second turning rod relative to the second deflecting rod. With both deflecting rods, the feeding axis of the direction of travel of the sheeting, seen in vertical projection, always coincides with the run-off axis. Proceeding from an initial position in which the longitudinal axes of the turning rods extend at right angles to one another and at 45° to the longitudinal axis of the take-away rollers respectively and in which the longitudinal axis of the second deflecting rod is disposed at right angles to the longitudinal axis of the take-away rollers, and after a rotation of the take-away roller of 90° about its vertical axis of rotation up to the point where the second deflecting rod stood still, the first turning rod and the second deflecting rod are interlocked with the first deflecting rod, so that these rods rotate together with the take-away rollers by a further 90°.

The two turning rods and the second deflecting rod are each fastened at a swivel. These swivels, whose axes coincide with the axis of rotation of the take-away roller, are pivoted in a rack above the take-away roller. The rotating motion of these rods can possibly be effected by the traction exerted by the winding-up device and prevailing in the tubing, which is, however, only incompletely possible, since friction is unavoidable between the swivels and the rack and, moreover, the traction prevailing in the tubing fluctuates. The turning motion of these rods is, therefore, preferably produced by drives.

Thus, a complicated regulation of the rotating motion of the rods results. With this known device, two deflecting rods are required in addition to the two turning rods. Thus, a large overall height of the rack above the take-away rollers results.

German Patent Specification No. 20 35 584 shows a similar device with which the rotating motion of the two turning rods and the second deflecting rod must, however, always take place in a guided manner.

With the device according to German Pat. No. 21 56 079, only one deflecting rod and only one turning rod are provided. The deflecting rod is arranged as described above. It is disadvantageous with this device that when the turning rod reverses the take-away rollers which rotate about the vertical axis of rotation by ±135°, the longitudinal axis of the turning rod forms an obtuse angle with the feed and run-off axis of the direction of travel of the tubing, which is guided over them, so that there is the danger that the direction of travel of the tubing slips off from the turning rod when reversing.

It is the object of the invention to improve the above-noted device in such a way that the number of rods is reduced and the direction of travel of the tubing is guided over the rods at such angles that it cannot slip off from the rods.

In accordance with the invention, a take-away device for a plastic tubing is produced in a blowing process in which the tubing is flattened by squeeze rollers followed by a pair of take-away rollers. The pair of take-away rollers which have horizontal axes of rotation swivel reversingly about a vertical axis of rotation. The flattened tubing is fed to a stationary wind-up device, whereby two turning rods over which the flattened tubing is guided, are arranged between the take-away rollers and the stationary wind-up device, and swivel reversingly about the vertical axis of rotation of the pair of squeeze rollers. The first turning rod can thereby be swivelled about a first vertical axis which, together with the take-away rollers, swivels about the vertical axis of rotation of the pair of take-away rollers. The second turning rod can be turned about a second vertical axis which forms a plane with the vertical axis of rotation of the pair of take-away rollers, which extends parallel to the direction of travel of the tubing from the second turning rod to the wind-up device.

BRIEF DESCRIPTION OF THE DRAWINGS

Two embodiments of the invention are described in greater detail in the following with reference to the drawings, showing:

FIGS. 3 to 6 positions of the parts of the device with a rotating position of the takeaway rollers of 0°, 45°, 90° and 135°;

DETAILED DESCRIPTION OF THE DRAWINGS

Figure 1:
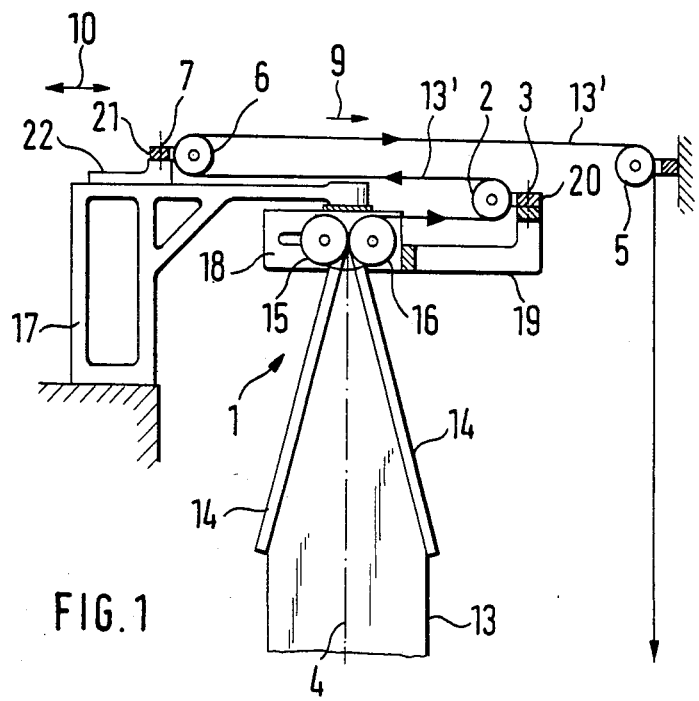
FIG. 1 the side view of a first embodiment.

With the embodiment according to FIGS. 1 to 6, the tubing 13 coming from the blow head reaches the squeeze rollers 1 where it is flattened between the flattening plates 14. It is then guided through the opening to two take-away or squeeze rollers 15, 16. The flattened tubing, which is free from air on the inside, passes from the opening between the take-away rollers 15, 16 to a first turning rod 2. From this turning rod 2, the flattened tubing 13' proceeds to the last one of a plurality of turning rods, described below as a second turning rod 6 from where it passes around deflecting roller 5, which forms part of a stationary winding-up device, which is otherwise not illustrated. The two flattening plates 14 and the two take-away rollers 15, 16 are supported by an auxiliary rack 18, which is pivoted by a stationary rack 17, that is, in such a way that the take-away rollers 15, 16, whose longitudinal axes extend horizontally, are pivoted with the flattening plates 14 about a vertical axis of rotation 4. This vertical axis of rotation 4 is identical to the center axis of the tubing 13 and thus with the center axis of the blow head, which is not shown, from where it is removed from the take-away rollers 15, 16.

The auxiliary rack 18, which is supported at the rack 17, has a horizontally extending arm 19 which supports a U-shaped frame 20 which, in turn, supports the turning rod 2. This frame 20 can be turned about a vertical axis 3. The second turning rod 6 is also supported by a frame 21 which, in turn, is supported by the rack 17 in such a way that the second turning rod 6 can be turned about a vertical axis 7.

In this way, the swivel axis 3 of the first turning rod 2 turns together with the take-away rollers 15, 16 about the axis of rotation 4. The first turning rod 2 can be turned about this swivel axis 3.

The plane 8, formed by the two vertical axes 4 and 7, extends parallel to the run-off direction 9 of the flattened sheeting 13' from the second turning rod 6 to the winding-up device, thus, at right angles to the longitudinal axis of the deflecting roller 5 in the illustrated example.

In addition, the auxiliary frame 22, which supports the frame 21, can be horizontally movable in this plane 8 at rack 17, which is illustrated by the double arrow 10.

Figure 2:
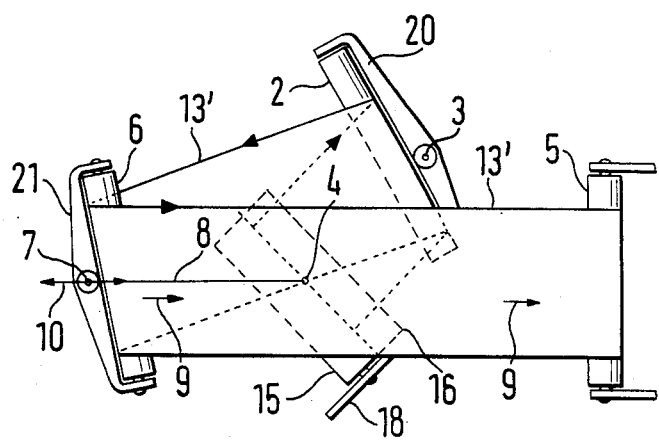
FIG. 2 a top view of the first embodiment with the position of the parts according to FIG. 4.
Figure 7:
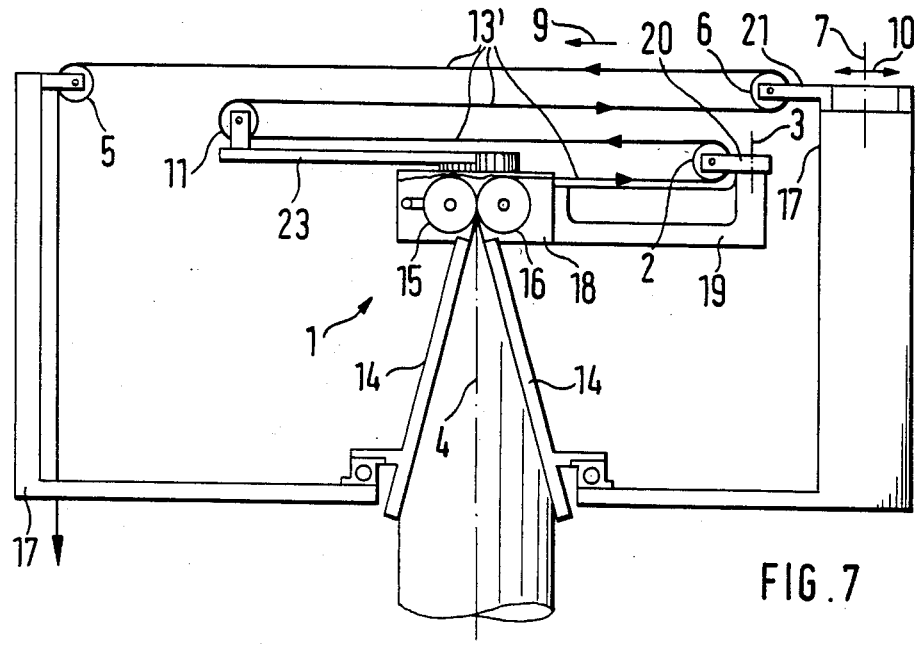
FIG. 7 the side view of a second embodiment.
Figure 8:
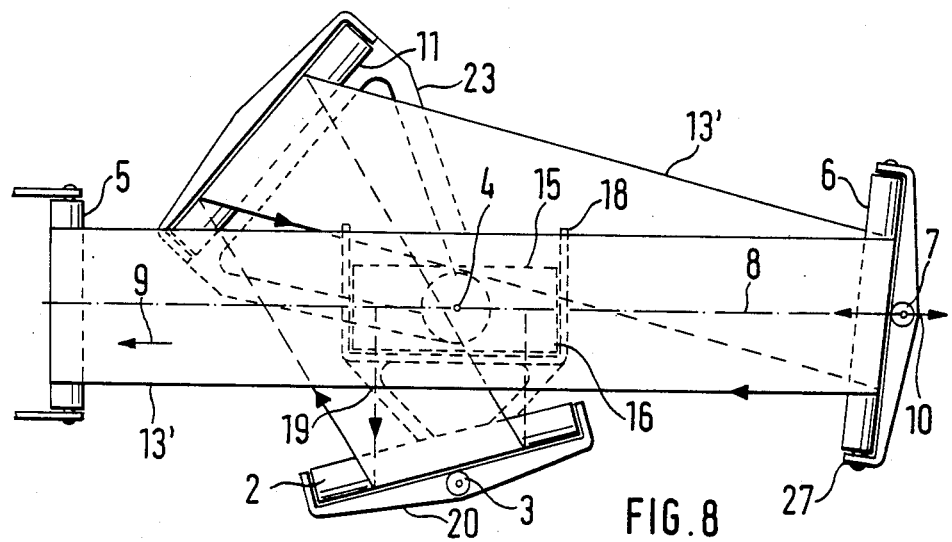
FIG. 8 a top view of the second embodiment at a position of the parts according to FIG. 10.

The movement sequences with the first embodiment are described in greater detail in the following with reference to FIGS. 3 to 6, whereby the device is shown in a configuration turned by 180° in comparison to FIG. 2, in order to be able to better illustrate the conditions with respect to the second embodiment. Starting from the position in FIG. 3, the take-away rollers 15, 16 are turned counterclockwise by 135° about the axis of rotation 4 in the position shown in FIG. 6. After reaching the position according to FIG. 6, a reversal of rotation of the turning of the take-away rollers 15, 16 occurs about the vertical axis of rotation 4 and this turning, now clockwise, continues until the position is reached which is mirror-inverted to the plane 8 to the position according to FIG. 6. A reversal occurs there and the subsequent rotation is continued counterclockwise until the position according to FIG. 6 is again reached via the positions according to FIGS. 3 to 5.

With the initial position according to FIG. 3, the longitudinal axes of the take-away rollers 15, 16 and the turning rods 2, 6 extend at right angles to the plane 8, that is, at right angles to the direction of travel of the sheeting 13' from the second turning rod 6 to the winding-up device. The longitudinal axes are, therefore, placed parallel to the longitudinal axis of the deflecting roller 5 in the illustrated example. In the vertical projection, the first turning rod 2 is on the same side of the squeeze rollers 1 as the deflecting roller 5, whereas the second turning rod 6 is on the side opposite to it. The swivel axis 3 is hereby in plane 8, which is formed by the axis of rotation 4 and the swivel axis 7.

If the take-away rollers 15, 16 now turn counterclockwise about the axis of rotation 4, then the turning rod 2 carries out a rotating motion clockwise about its swivel axis 3. At the same time, the turning rod 6 is turned counterclockwise about its swivel axis 7.

When the position shown in FIG. 6 is reached, then the take-away rollers 15, 16 have turned about the axis of rotation 4 by 135°. At the same time, the swivel axis 3 has hereby turned counterclockwise together with the takeaway rollers 15, 16 about the axis of rotation 4 by 135°. The first turning rod 2 was hereby turned about its vertical swivel axis 3 by 45°, whereas the second turning rod 6 carried out a rotating motion of 22.5° about its swivel axis 7.

The take-away rollers 15, 16 remove the tubing 13 with a steady speed. Since the length of the folded tubing 13' is subjected to changes during its course of travel from the take-away rollers 15, 16 to the winding-up device, which are determined by reversing the take-away rollers 15, 16 and by the positions of these take-away rollers 15, 16 and the turning rods 2, 6, a compensating device for these changes is provided. For this purpose, the center of rotation 7 of the second turning rod 6 is horizontally movable from and to the axis of rotation 4 in plane 8.

With the embodiment according to FIGS. 7 to 11, those parts, which are the same as those in the first embodiment, have the same reference numbers as in the first embodiment. With the second embodiment, it is possible that the squeeze rollers 1, starting from the initial position according to FIG. 9, can turn in both directions about the axis of rotation 4 by 180°. The auxiliary rack 18, which is pivoted by rack 17 about the axis of rotation 4, supports the take-away rollers 15, 16 and carries the flattening plates 14. The frame 20, which can be turned about the axis 3, is supported at the arm 19, said frame in turn supporting the first turning rod 2. The flattened tubing 13' proceeds from this turning rod 2 to an additional turning rod 11, which is supported by a frame 23 which can be turned about the axis of rotation 4. Accordingly, the additional turning rod 11 always assumes a position, in which it forms a chord to a circle whose center is on the axis of rotation 4. From the additional turning rod 11, the flattened tubing 13' comes to the second turning rod 6, which is supported by the frame 21 which, in turn, is pivoted at rack 17 about the vertical axis 7. From the second turning rod 6, the flattened tubing 13' again proceeds to the deflecting roller 5 which already constitutes part of the winding-up device.

Figure 9:
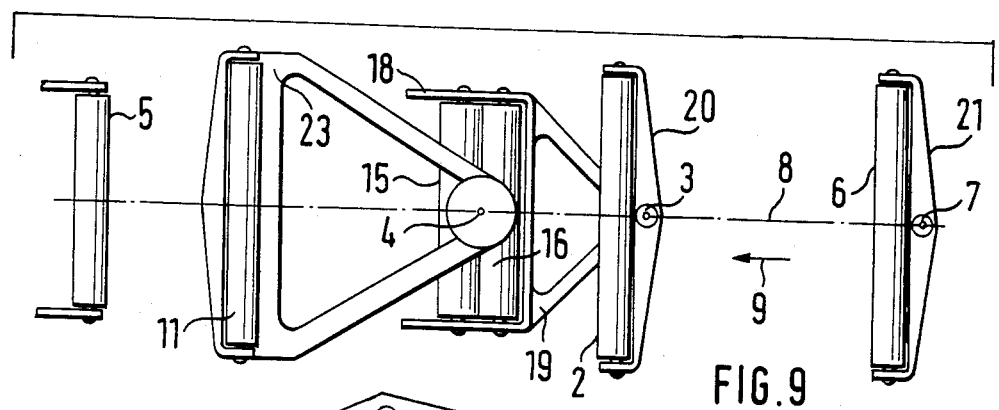
FIGS. 9 to 11 top views of the second embodiment at rotating positions of the take-away rollers of 0°, 90° and 180°.

In the initial position according to FIG. 9, the longitudinal axes of the take-away rollers 15, 16 and the turning rods 2, 6, 11 are again disposed at right angles to the plane 8. The axis of rotation 4, as well as the swivel axes 3, 7 extend in this plane. Seen in the vertical projection, the first and the second turning rod 2, 6 are on the side of the take-away rollers 15, 16 turned away from the deflecting roller 5, whereas the additional turning rod 11 is arranged on the opposite side between the take-away rollers 15, 16 and the deflecting roller 5.

Figure 10:
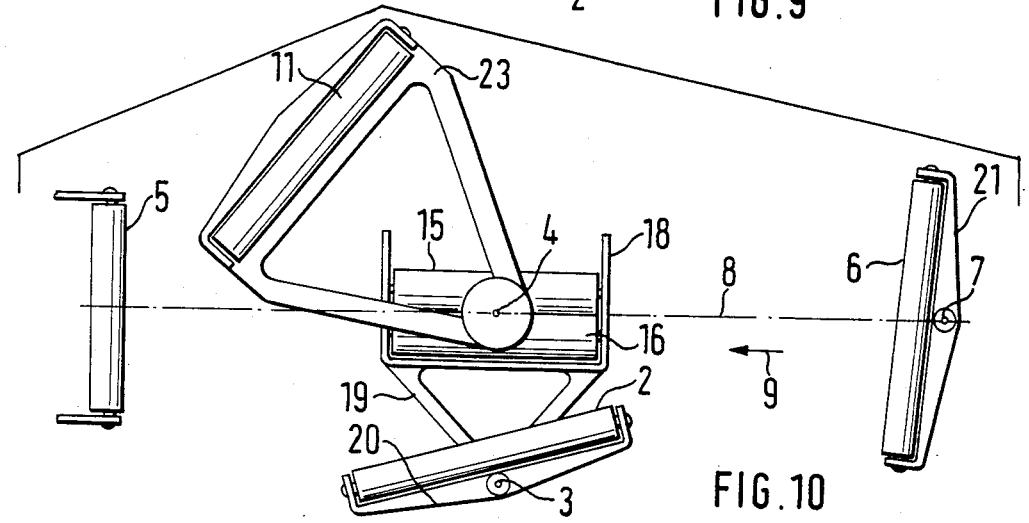
Figure 11:
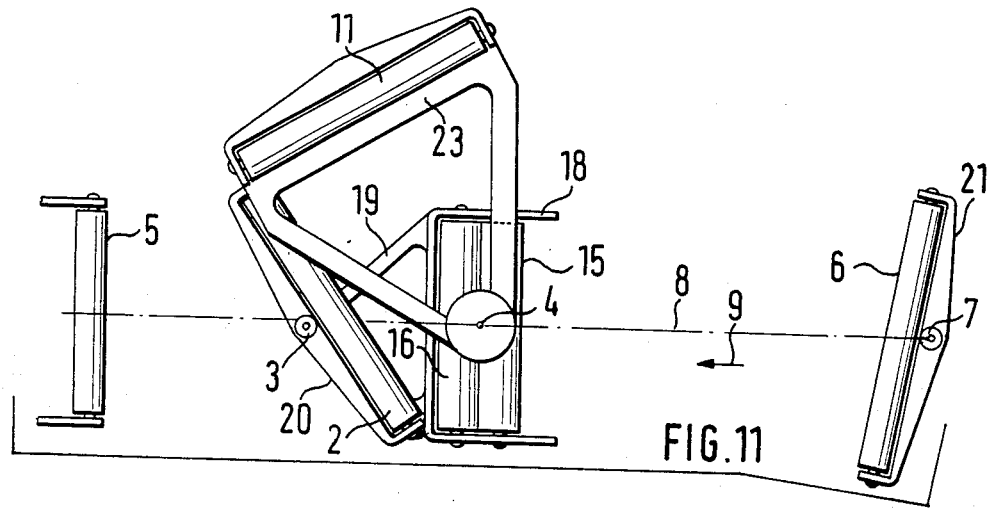

If the squeeze rollers 1 are turned clockwise with the take-away rollers 15, 16, then the additional turning rod 11 is also turned clockwise about the axis of rotation 4 and the second turning rod 6 clockwise about the swivel axis 7, whereas the first turning rod 2 carries out a turning movement counterclockwise about its swivel axis 3. The conditions when the take-away rollers 15, 16 are turned about the axis of rotation 4 by 90° are shown in FIG. 10. FIG. 11 shows the final position in which, starting from the position according to FIG. 9, the take-away rollers 15, 16 turned about the axis of rotation 4 by 180°. In this position, a rotation reversal of the take-away rollers 15, 16 occurs, which now turn counterclockwise about the axis of rotation 4. This rotation is continued by a further 180° beyond the position according to FIG. 9 until a position is attained in which the parts are arranged mirror-inverted to plane 8 in comparison to FIG. 11.

If the take-away rollers 15, 16 are turned about the axis of rotation 4 by 180°, then the first turning rod 2 carries out a rotating motion about its swivel axis 3 by approximately 45°, which itself was turned about the axis of rotation 4 by 180°. The turning of the additional turning rod 11 about the axis of rotation 4 amounts to a little more than 45°, whereas the rotating motion of the second turning rod 6 about its swivel axis 7 amounts to approximately 22.5°.

I claim:

1. A take-away device for plastic tubing produced by an extruder having a stationary tubing blow head used in a blowing process comprising a pair of squeeze rollers for flattening the plastic tubing therebetween, said pair being swivelled about a vertical axis of rotation, and further including take-away rollers having horizontal axes of rotation about at least two turning rods having longitudinal axes, which are arranged in sequence between the squeeze rollers and a stationary wind-up device, which longitudinal axes can be pivoted relative to the squeeze rollers, the first turning rod following the squeeze rollers being pivoted about a first vertical axis, which is located at a distance from the vertical axis of rotation of the pair of squeeze rollers and turns together with the pair of squeeze rollers about their vertical axis of rotation, the last one of a plurality of turning rods following the squeeze rollers and prior to the wind-up device being swivelled about a second vertical axis which also extends at a distance from the vertical axis of rotation of the pair of squeeze rollers, whereby a plane defined by the axis of rotation of the pair of squeeze rollers and the second vertical axis always extends parallel to the direction of travel of the tubing from the second turning rod to the wind-up device.

2. A take-away device according to claim 1, in which an additional turning rod having a horizontal longitudinal axis is arranged between the first turning rod and said last turning rod which can be swivelled about the vertical axis of rotation of the pair of squeeze rollers and forms a chord of a circle about the latter axis of rotation.

3. A take-away device according to claim 2, in which the distance between the second axis and the axis of rotation of the pair of squeeze rollers is variable.

4. A take-away device according to claim 3, in which from an initial position in which the longitudinal axes of the turning rods and the take-away rollers all extend at right angles to said plane, and in the vertical projection, the additional turning rod is located between the squeeze rollers and the wind-up device and the first vertical axis is located between the axis of rotation of the pair of squeeze rollers and the second vertical axis, with a rotation of the pair of squeeze rollers by 180° to each side, the first turning rod is swivelled by approximately 45° about the first vertical axis, said last turning rod is swivelled by approximately 22.5° about the second vertical axis and the additional turning rod is swivelled by approximately 45° about the axis of rotation of the pair of squeeze rollers, whereby the swivelling motion of the first turning rod about the first axis is opposite to the motion of the pair of squeeze rollers and said last and the additional turning rod.

5. A take-away device according to claim 2, in which from an initial position in which the longitudinal axes of the turning rods and the take-away rollers all extend at right angles to said plane, and the first vertical axis lies in the vertical projection between the squeeze rollers and the wind-up device, with the pair of squeeze rollers of 135° to each side, the first turning rod is turned by approximately 45° about the first vertical axis and the second turning rod is turned by approximately 22.5° about said last vertical axis, whereby the rotation motion of the first turning rod extends about the first axis opposite to the motion of the pair of squeeze rollers and said last turning rod.

6. A take-away device according to claim 2, in which from an initial position in which the longitudinal axes of the turning rods and the take-away rollers all extend at right angles to said plane, and in the vertical projection, the additional turning rod is located between the squeeze rollers and the wind-up device and the first vertical axis is located between the axis of rotation of the pair of squeeze rollers and the second vertical axis, with a rotation of the pair of squeeze rollers by 180° to each side, the first turning rod is swivelled by approximately 45° about the first vertical axis, said last turning rod is swivelled by approximately 22.5° about the second vertical axis and the additional turning rod is swivelled by approximately 45° about the axis of rotation of the pair of squeeze rollers, whereby the swivelling motion of the first turning rod about the first axis is opposite to the motion of the pair of squeeze rollers and said last and the additional turning rod.

7. A take-away device according to claim 1, in which the distance between the second axis and the axis of rotation of the pair of squeeze rollers is variable.

8. A take-away device according to claim 7, in which from an initial position in which the longitudinal axes of the turning rods and the take-away rollers all extend at right angles to said plane, and the first vertical axis lies in the vertical projection between the squeeze rollers and the wind-up device, with the pair of squeeze rollers of 135° to each side, the first turning rod is turned by approximately 45° about the first vertical axis and said last turning rod is turned by approximately 22.5° about the second vertical axis, whereby the rotation motion of the first turning rod extends about the first axis opposite to the motion of the pair of squeeze rollers and said last turning rod.

9. A take-away device according to claim 7, in which from an initial position in which the longitudinal axes of the turning rods and the take-away rollers all extend at right angles to said plane, and in the vertical projection, the additional turning rod is located between the squeeze rollers and the wind-up device and the first vertical axis is located between the axis of rotation of the pair of squeeze rollers and the second vertical axis, with a rotation of the pair of squeeze rollers by 180° to each side, the first turning rod is swivelled by approximately 45° about the first vertical axis, said last turning rod is swivelled by approximately 22.5° about the second vertical axis and the additional turning rod is swivelled by approximately 45° about the axis of rotation of the pair of squeeze rollers, whereby the swivelling motion of the first turning rod about the first axis is opposite to the motion of the pair of squeeze rollers and said last and the additional turning rod.

10. A take-away device according to claim 1, in which from an initial position in which the longitudinal axes of the turning rods and the take-away rollers all extend at right angles to said plane, and the first vertical axis lies in the vertical projection between the squeeze rollers and the wind-up device, with the pair of squeeze rollers of 135° to each side, the first turning rod is turned by approximately 45° about the first vertical axis and said last turning rod is turned by approximately 22.5° about the second vertical axis, whereby the rotation motion of the first turning rod extends about the first axis opposite to the motion of the pair of squeeze rollers and said last turning rod.

11. A take-away device according to claim 7, in which the flattened tubing is horizontally guided between the squeeze rollers and the turning rods and to the wind-up device respectively.

* * * * *